UNITED STATES PATENT OFFICE.

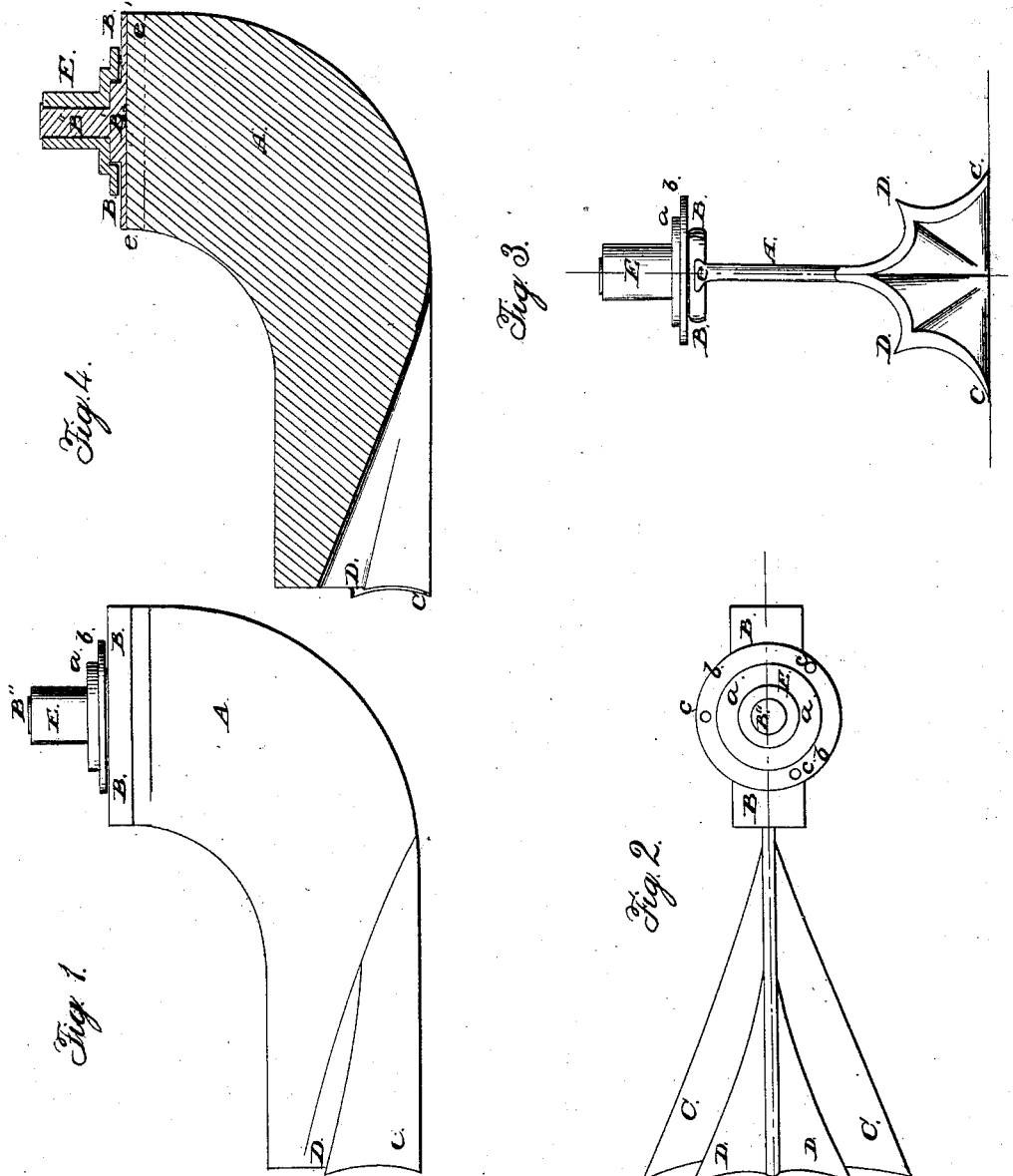

GEO. C. AIKEN, OF NASHUA, NEW HAMPSHIRE.

IMPROVEMENT IN CULTIVATOR-TEETH.

Specification forming part of Letters Patent No. 27,956, dated April 24, 1860.

*To all whom it may concern:*

Be it known that I, GEORGE C. AIKEN, of Nashua, in the county of Hillsborough, in the State of New Hampshire, have invented a certain new and useful Improvement in the Harrow or Cultivator Tooth for which Letters Patent were granted on the 14th day of February, 1860; and I do hereby declare that the following is a full, clear, and exact description thereof, reference being had to the accompanying drawings, forming a part of this specification, in which—

Figure 1 represents a side view of my improved tooth. Fig. 2 represents a top view of the same. Fig. 3 represents a rear view, and Fig. 4 represents a section on lines A B, Figs. 2 and 3.

The flanges or mold-boards C C, cutters D D, and vertical colter A are constructed the same as shown and described in my patent above referred to. The plate B, however, instead of being fixed, as in that patent, is formed with a round shoulder, B', and a journal, B''. The latter passes up through a socket-piece, E, and is then headed down slightly, whereby it is prevented from dropping out.

The lower part, $a$, of socket-piece E is hollowed out on the under side, so as to fit over shoulder B', while the part $b$ rests on plate B.

The upper part, $e$, of the colter A slides into a dovetailed groove in the under side of plate B, the same as in my former patent, the front part, $e'$, being widest. The colter A is held firm and secure, since the harder it is forced back the tighter it fits.

To fit the tooth to a frame for use, a hole is bored of such size and form as to permit the parts E and $a$ to fit up into the frame, when screws are passed through holes $c$ in the bottom $b$. The socket-piece might pass through the frame and be fastened by a nut screwed upon its end on top of the frame.

By the improvement above described my patent tooth is rendered more convenient, useful, and valuable. In passing over or through the ground it moves with great ease, while if it is necessary to remove a tooth it can be turned crosswise of the frame, whereby it can be driven out of the plate B in a much quicker and more convenient manner than if it had to be driven out in the direction in which it stands when in action.

I do not claim swiveling harrow-teeth; but

What I claim as an improvement on the tooth patented by me on the 14th day of February, 1860, is—

The combination and arrangement of the socket E, shoulder B', and journal B'', with the plate B, vertical colter A, flanges or mold-boards C C, and cutters D D, substantially as set forth.

GEO. C. AIKEN.

Witnesses:
CHAS. A. DEWEY, Jr.,
JULIUS GUNTHER.